United States Patent [19]

Gagliani et al.

[11] Patent Number: 4,546,115

[45] Date of Patent: Oct. 8, 1985

[54] POLYIMIDE COMPOSITIONS AND FOAMS AND METHODS OF MAKING SAME

[76] Inventors: John Gagliani, 6280 Lance Pl., San Diego, Calif. 92120; John V. Long, 1756 E. Lexington Ave., El Cajon, Calif. 92021

[21] Appl. No.: 705,129

[22] Filed: Feb. 25, 1985

[51] Int. Cl.$^4$ .............................................. C08J 9/02
[52] U.S. Cl. ..................................... 521/77; 521/184; 521/185; 521/189
[58] Field of Search ................. 521/185, 184, 189, 77

[56] References Cited

U.S. PATENT DOCUMENTS

| | | | |
|---|---|---|---|
| Re. 30,213 | 2/1980 | Gagliani et al. | 521/185 |
| 3,726,834 | 4/1973 | Acle, Jr. | 521/185 |
| 3,793,281 | 2/1974 | Acle, Jr. | 521/185 |
| 3,966,652 | 6/1976 | Gagliani et al. | 521/185 |
| 4,070,312 | 1/1978 | Gagliani et al. | 521/185 |
| 4,315,077 | 2/1982 | Gagliani et al. | 521/185 |
| 4,315,080 | 2/1982 | Gagliani et al. | 521/185 |
| 4,346,182 | 8/1982 | Gagliani et al. | 521/185 |
| 4,426,463 | 1/1984 | Gagliani et al. | 521/185 |

*Primary Examiner*—Morton Foelak
*Attorney, Agent, or Firm*—Frank D. Gilliam

[57] ABSTRACT

Methods of making modified polyimide compositions and the resulting compositions. A polyimide forming material is prepared by treating an aromatic dianhydride with an esterifying solvent, then adding a suitable diamine. In order to obtain a foam which is non-friable and resistant to repeated compressive forces, the selected diamine must contain an aliphatic moiety in the chain. This material is dried to a powder or film. A foam is produced by heating the material to reaction temperature for a period sufficient to produce a stable foam. The material melts, then spontaneously expands into a foam which becomes self supporting and cures to a resilient, flexible non-friable foam.

10 Claims, No Drawings

POLYIMIDE COMPOSITIONS AND FOAMS AND METHODS OF MAKING SAME

BACKGROUND OF THE INVENTION

This invention relates in general to polyimide resins and, more specifically, to compositions and methods for making resilient, flame resistant, non-friable polyimide foams.

Prior U.S. Pat. Nos. 3,554,939 and 4,296,208 disclosed and claimed certain polyimide compositions which are flame resistant and useful as foams.

The polyimide compositions described in the above-mentioned prior patents are made by first treating tetracarboxylic acid dianhydride with an esterifying solvent to produce a half ester.

The polyimide forming material is then prepared by adding to each mole of half ester, two moles of a mixture of suitable diamines at least 1.4 moles being an aromatic diamine, producing a viscous fluid, containing an intimate, unpolymerized solution which is capable of being converted to a high molecular weight polymer by the application of heat.

The solution may be coated onto a surface and dried by heating to a temperature in the 150°-190° F. range for 14 to 18 hours. Thereafter the dry material may be crushed, pulverized and sieved. Alternatively, the composition may be spray dried. The powder then may be converted into a foam by various techniques such as dielectric, thermal and microwave heating.

The resulting foam is flexible, resilient and generally suitable for use in insulation and, to an extent in seat cushions. We have found, however, that this prior foam material has a limited life span in applications, such as seat cushions, where it is repeatedly compressed and released. When exposed to dynamic fatigue, these foams tend to particulate and eventually, totally disintegrate.

Thus, there is a continuing need for improved polyimide foam compositions which combine the flexibility, resiliency, flame resistance, and lack of toxic emissions when charing with the ability to resist vibration, shock and high cycle dynamic fatigue without particulating or otherwise disintegrating.

SUMMARY OF THE INVENTION

We have now found that, by suitably varying certain ingredients, within specified limits, materials similar to those described above and in the cited prior patents can be used to produce an improved resilient, flame resistant, non-friable cellular structure, which overcomes the above noted problems.

The basic steps in producing our improved resilient foam are esterifying a suitable aromatic dianhydride with a suitable esterifying solvent, adding a suitable diamine having an aliphatic moiety in the chain, drying the solution to a film or powder and finally heating the dry material to a temperature sufficient to cause the dry material to melt and spontaneously foam. The heating appears to cause the dry material to simultaneously undergo a condensation reaction and an exchange reaction. The condensation reaction produces water and alcohol vapors which cause the molten mass to expand. As the reactions proceed, the molten mass forms a cellular structure which becomes self-supporting and finally cures to an imide polymer.

DETAILED DESCRIPTION OF THE INVENTION

Any suitable aromatic dianhydride may be used in the preparation of the desired imides. Typical aromatic dianhydrides include those described and referenced in the patents listed above. Due to their ready availability at reasonable prices and the excellent foams which result, pyromellitic dianhydride and 3,3', 4,4' benzophenone tetracarbolic acid dianhydride (BTDA) are preferred.

The dianhydride is esterified by dissolving it in a suitable reactive solvent at a suitable temperature. Any suitable reactive solvent which acts as an esterifying agent may be used. Typical of these are aliphatic alcohols having up to 7 carbon atoms and aromatic alcohols, which may have halogen or amino substitutions, and mixtures thereof. Best results have been obtained with methyl alcohol.

Once the esterification is complete, the selected diamine or diamines are added to the half-ester solution. Preferably, an approximately stoichiometric quantity of diamine is used.

Any suitable diamine having an aliphatic moiety in the molecular chain may be used. Both aromatic-aliphatic and aliphatic diamines may be used. The diamine may be almost entirely aromatic-aliphatic diamines or basically aromatic-aliphatic diamines with up to about 50 mole % aliphatic-aromatic, the foam has excellent flexibility and resistance to fire, but resistance to particulation increases with the inclusion of the aliphatic diamine. The aromatic-aliphatic diamines are those which contain two benzene rings joined by an aliphatic chain and have the general formula:

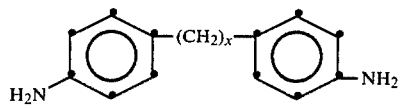

wherein x is a positive integer from 1 to 20. Typical of these are 4,4'-diaminodiphenyl propane and mixtures thereof.

While the aliphatic moiety between the benzene rings may have as many as 20 carbon atoms, the flame resistance of the foam tends to decrease with the longer aliphatic chains. Where flame resistance is important, it is preferred that "x" in the above formula be from 1 to 3. While the $NH_2$ radical is preferably in the para position as shown in the above formula, good results are also obtained with that radical in the meta position.

Any suitable aliphatic diamine having the following general formula may be used:

$$H_2N=(CH_2)_y=NH_2$$

wherein y is an integer from 2 to 12. Typical aliphatic diamines include 1,2-diamine ethane, 1,3-diamino propane, 1,4-diamino propane, 1,6-diamino hexane, 1,10-diamino decane, 1,12-diamino dodecane and mixtures thereof.

While the physical or chemical basis for the improved physical characteristics of the foam produced by the method of our invention, primarily, its non-friability, is not fully understood, it appears to result from the use of the aromatic-aliphatic diamine mixed with an aliphatic diamine, where the prior are used an aromatic diamine alone or mixed with an aliphatic and/or heterocyclic diamine.

Of the diamines described above, best results are obtained with 4,4'-diamino diphenyl methane as the aromatic-aliphatic diamine and 1,6 diamino hexane as the aliphatic diamine.

Additives to improve various characteristics of the final foam may be added as desired. Any appropriate additives may be used, such as fillers, surfactants, ultraviolet absorbers or the like. We prefer to include a surfactant to improve the uniformity of the foam cellular structure. Typical surfactants include Dow Corning Corp. 190 or 193, (a silicone surfactant), FC430 from Minnesota Mining & Manufacturing Co., Zonyl FSC from E. I. dePont de Nemours & Co., and L550 from Union Carbide Corp. While any suitable concentration may be used, from about 0.01 to 2% (by weight, based on the weight of the resin prior to drying) is preferred. Of these surfactants, best results have been obtained with Zonyl FSC. Fillers and reinforcing additives may be added prior to drying the resin. Typical fillers include Kevlar aramid fibers, graphite fibers, glass fibers, carbon and graphite fibers, Teflon flurocarbon powders and mixtures thereof.

The solution is then dried by any suitable method. Simply heating the solution in an oven to a temperature of about 65°-95° C. Until dry is satisfactory. Other conventional methods, such as spray drying, rotary drying, thin film evaporation, etc. may be used as desired. The resulting free-flowing powder or flakes may be further ground or treated as desired and may be stored indefinitely at room temperature.

The final step in converting the powder into a foam is accomplished by heating the powder to the selected foaming temperature for a suitable period. The foaming can be accomplished by any suitable heating means, such as dielectric, air circulating oven, other thermal or microwave heating. For example, heating in an oven at 120° to 320° C. for 10 to 60 minutes is very effective. Microwave heating is preferred in many cases due to the uniformity and speed of heating.

As the powder is heated it first melts and, as the condensation reaction begins, water and alcohol are released and vaporized, causing the molten mass to expand. The resulting cellular structure becomes self-supporting and finally cures to an imide polymer. The resulting foam is non-friable, tough, resilient and will not emit significant smoke or toxic by-products when exposed to open flame.

Details of the invention will be further understood upon reference to the following examples, which describe preferred embodiments of the methods and compositions of this invention. All parts and percentages are by weight, unless otherwise indicated.

EXAMPLE I

About 322.2 g (1M) of 3,3', 4,4'-benzophenonetetracarboxylic acid dianhydride is dissolved in about 400 g of isopropanol and the solution is refluxed (at about 75° C.) until the solution is clear. The mixture is cooled to about 50° C. and about 148.7 g (0.75M) of 4,4'-diaminodiphenyl methane and about 29 g (0.25M) of 1,6-diaminohexane are added. The mixture is heated at about 55° C. until clear. The liquid is poured into a shallow dish and heated in an air circulating oven at about 82° C. until dried (about 1 hour). The dry resin is then pulverized into a powder having a maximum particle diameter of about 80 mesh. A 100 g sample of the powder is placed in an oven heated at about 288° C. for about 1 hour. A yellow resilient foam having a density of about 12.8 Kg/m3 (0.8 lb/ft3) results. The foam does not burn or give off smoke or toxic gases when exposed to an open flame. When tested by dynamic fatique test in accordance with the method described in ASTM-D-3574, paragraph 76 to 82, the foam does not particulate and is found to be non-friable.

EXAMPLE II

The steps of Example I are repeated, except that in place of the diamines listed there, the following diamines are used: IIa 188 g (0.95M) of 4,4'-diaminodiphenyl ethane and 6 g (0.05M) of 1,6-diamino hexane, IIb 99 g (0.5M) of 4,4'-diaminodiphenyl ethane and 58 g (0.5M) of 1,6-diamino hexane, IIc 49.5 g (0.25M) 4,4'-diaminodiphenyl ethane and 87 g (0.75M) of 1,6-diamino hexane, IId 108 g (1M) of para-phenylene diamine. Excellent, non-friable, flame resistant foams are produced in Examples IIa and IIb. Example IIc, which uses a high proportion of aliphatic diamine, produces a foam which is flexible but which has high density (33.6 Kg/m3) and burns with emission of substantial quantities of toxic smoke when exposed to an open flame. Example IId which uses an aromatic diamine, produces a good foam, but which particulates when exposed to the fatigue test described in Example I.

EXAMPLE III

The procedures of Example I are repeated except that the diamines used are as follows; IIIa 113 g (0.6M) 4,4'-diaminodiphenyl propane and 20 g (0.4M) 1,2-diamino ethane, IIIb 150 g (0.8M) 4,4'-diaminodiphenyl propane and 22 g (0.2M) 1,12-diamino dodecane, IIIc 41 g (0.9M) 4,4-diaminodiphenyl ethane and 14 g (0.1M) 1,8-diamino octane. In each case an excellent, non-friable, flame resistant, resilient foam results.

EXAMPLE IV

The procedures of Example I are repeated with only the dianhydride changed, as follows: IVa 218 g (1M) pyromellitic dianhydride, IVb 109 g (0.5M) pyromellitic dianhydride and 161 g (0.5M) 3,3', 4,4'-benzophenonetetracarboxylic acid dianhydride. In both cases non-friable, flame resistant foams are produced which are more rigid than those of Example I.

EXAMPLE V

The procedures of Example I are repeated, except that in place of isopropanol the following solvents are used: III(a) ethyl alcohol, III(b) aminoethyl alcohol, III(c) benzene, III(d) dimethyl acetamide and III(e) acetone. In each case [III(a) and III(b)] where a reactive solvent is used to esterify the dianhydride an excellent non-friable, flame resistant foam results. Where an inert solvent is used, in III(c) through III(e), foaming does not take place.

EXAMPLE VI

The procedures of Example I are followed with five samples, but only up to the heating to foam step. The five dry powder samples are placed in preheated circulating air ovens at the following temperatures for the following time periods: IV(a) about 125° C. for about 40 minutes., IV(b) about 200° C. for about 30 minutes, IV(c) about 220° C. for about 10 minutes, IV(d) about 235° C. for about 30 minutes, and IV(e) about 310° C.

for about 30 minutes. Each sample forms a non-friable foam of good resiliency and flame resistance.

EXAMPLE VII

The procedures of Example I are repeated except for the following additions to the mixture after the addition of the diamines: VIIa, about 1 wt.% of Zonyl FSC fluorocarbon surfactant and VIIb, about 2 wt.% of short graphite fibers. In each case the weight is based on the weight of the mixture. The mixtures are well stirred and the remaining steps of Example I are completed. The foam of Example VIIa is found to have improved foam cell uniformity and the foam of Example VIIb is found to have increased stiffness.

EXAMPLE VIII

The procedures of Example I are repeated, except that the mixture is dried to a powder by spray drying and the heating step is accomplished using a microwave oven. The powder is placed in the oven and a powder of about 1.0 KW is applied for about 6 minutes. Rapid melting and expansion result, producing an excellent non-friable resilient foam after about 6 minutes.

Although specific components, proportions and conditions have been specified in the above examples, these may be varied with similar results, where suitable. In addition, other materials may be added to the foamable material, such as fillers, colorants, ultraviolet absorbers, or the like.

Other applications, modifications and ramifications of the present invention will occur to those skilled in the art upon reading the present disclosure. These are intended to be included within the scope of the invention, as defined in the appended claims.

We claim:

1. In the method of making a polyimide precursor composition suitable for use in the manufacture of non-friable polyimide foams, which comprises the steps of esterifying an aromatic dianhydride with an esterifying solvent of produce a half-ester and reacting said half-ester with a diamine to produce a polyimide precursor composition;
   the improvement wherein:
   said diamine consists of a mixture of at least one aromatic-aliphatic diamine and from 0.1 to 50 mole % of at least one aliphatic diamine;
   said aromatic-aliphatic diamine having the general formula:

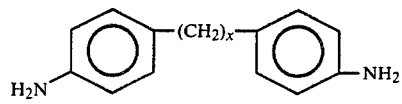

wherein
x is a positive integer from 1 to 20; and
said aliphatic diamine has the general formula:

wherein y is a positive integer from 2 to 12.

2. The improvement according to claim 1 further including the steps of drying said polyimide precursor composition and pulverizing the resulting dry material to a powder.

3. The improvement according to claim 2 further including the step of heating said powder to cause melting and foaming of said powder as the polymerization reaction is completed whereby a resilient, non-friable, flame resistant foam results.

4. The improvement according to claim 3 wherein said heating is accomplished in an oven heated to a temperature of from about 120° to 320° C. for a period of from about 10 to 60 minutes.

5. The improvement according to claim 3 wherein said heating is accomplished by exposing the powder to microwave energy.

6. The improvement according to claim 1 wherein said solvent is either an aliphatic alcohol having up to 7 carbon atoms, or an aromatic alcohol, or either alcohol with either a halogen or amino substitution, or a mixture of such alcohols.

7. The improvement according to claim 6 wherein said aromatic-aliphatic diamine is 4,4'-diamino diphenyl methane and said aliphatic diamine is 1,6-diamino hexane.

8. The improvement according to claim 1 further including the step of drying said polyimide precursor composition by spray drying.

9. The improvement according to claim 1 wherein "x" is a positive integer from 1 to 3.

10. The improvement according to claim 1 wherein the NH₂ radicals are each in the meta rather than para position.

* * * * *